UNITED STATES PATENT OFFICE.

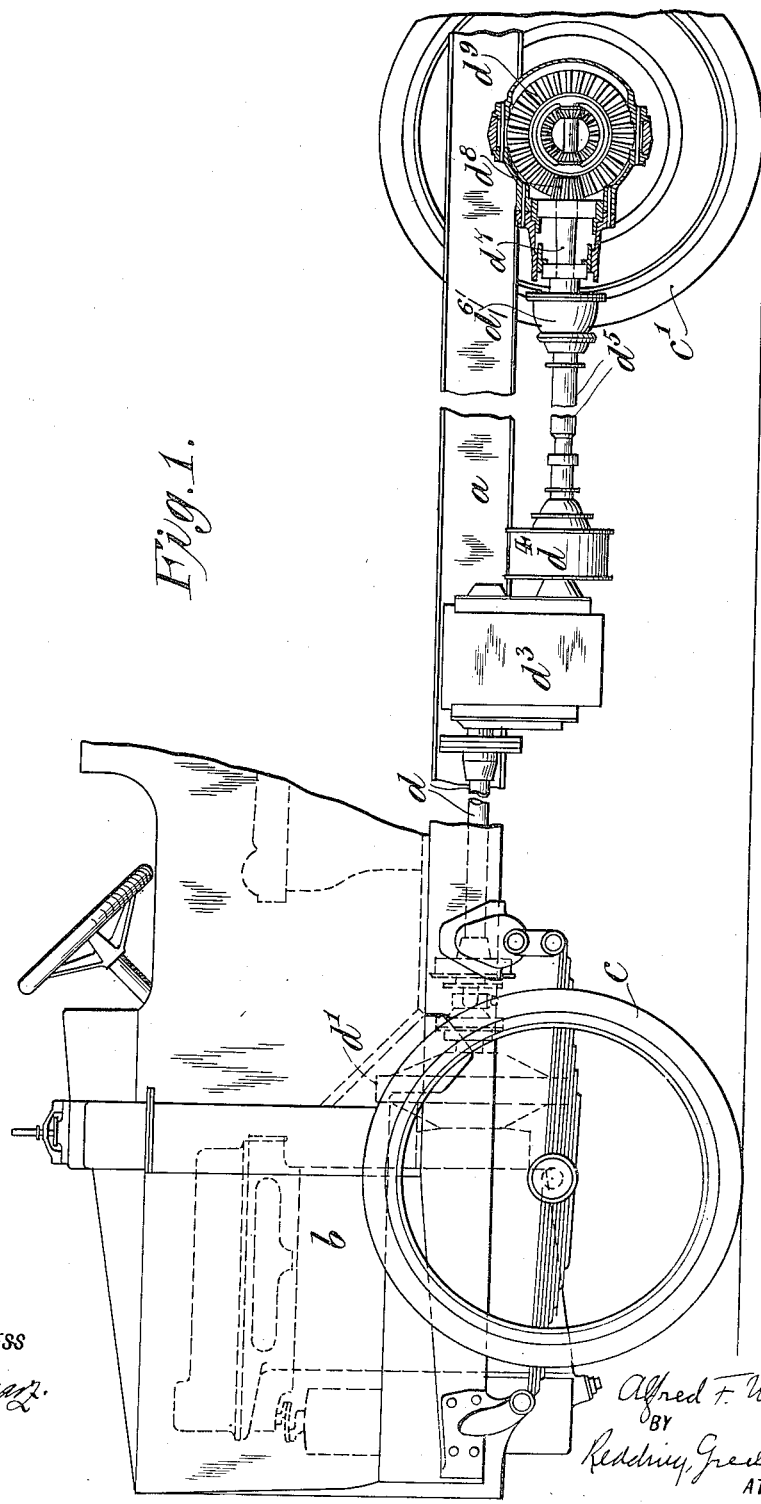

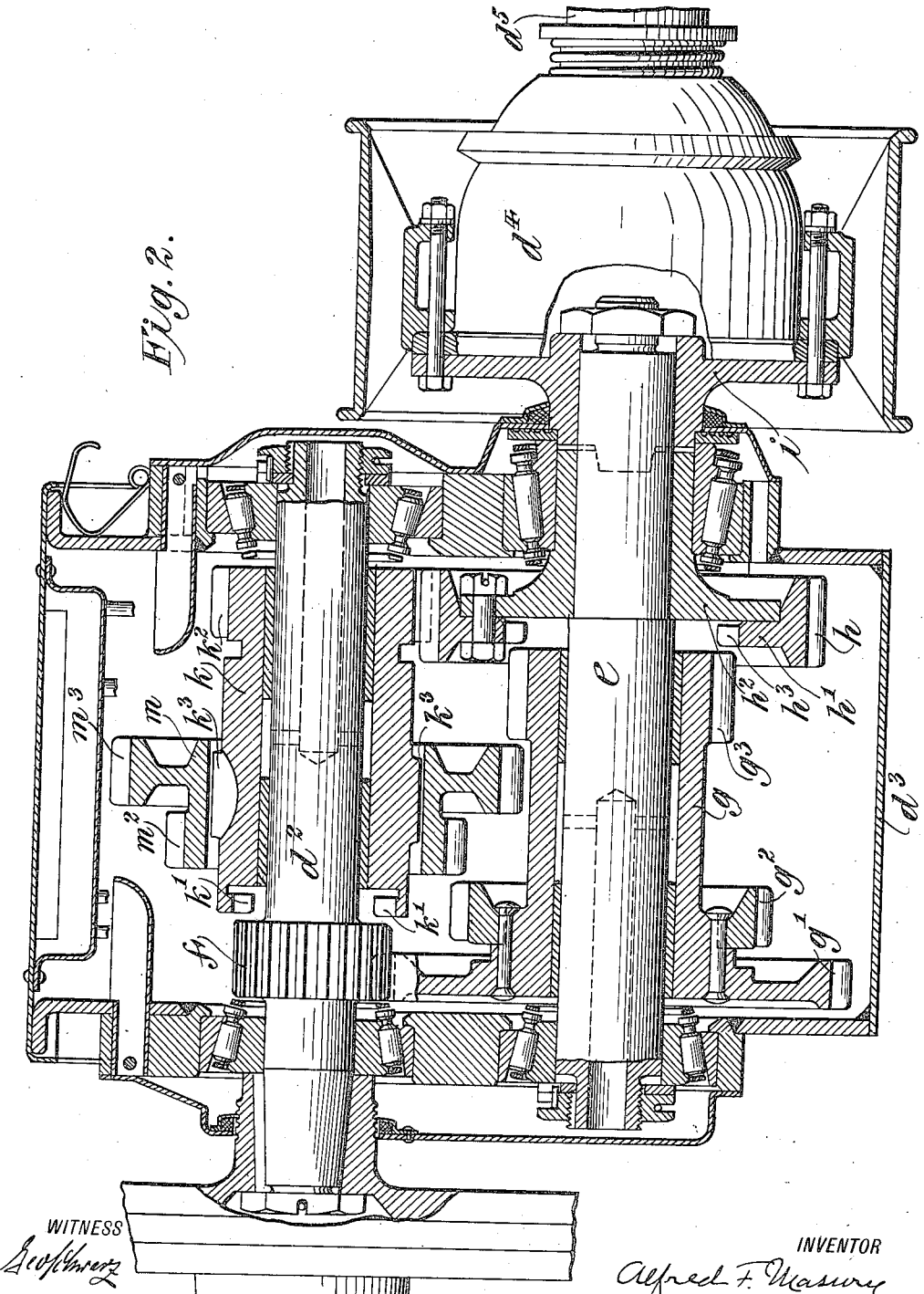

ALFRED F. MASURY, OF NEW YORK, N. Y., ASSIGNOR TO INTERNATIONAL MOTOR COMPANY, OF NEW YORK, N. Y., A CORPORATION OF DELAWARE.

TRANSMISSION-GEARING FOR MOTOR-TRUCKS.

1,290,626.

Specification of Letters Patent. Patented Jan. 7, 1919.

Application filed May 3, 1918. Serial No. 232,202.

*To all whom it may concern:*

Be it known that I, ALFRED F. MASURY, a citizen of the United States, residing in the borough of Manhattan of the city of New York, in the State of New York, have invented certain new and useful Improvements in Transmission-Gearings for Motor-Trucks, of which the following is a specification, reference being had to the accompanying drawings, forming a part hereof.

The transmission gearing which forms the subject of the present invention has been designed particularly with reference to its use in the driving of motor trucks, for which great power and very low speed are sometimes required, and more especially for motor trucks in which the drive from the rear transmission shaft to the rear axle is through bevel gears. Nevertheless, the transmission gearing itself is capable of use advantageously in the driving of other types of motor vehicles. Usually, in the transmission gearing of motor vehicles, particularly those other than trucks, the engine shaft is, for high speed, coupled direct to the transmission shaft. In motor trucks, such direct coupling of the driving shaft or engine shaft and the transmission shaft is undesirable because the high speed thus produced is not desired, while the increased power afforded by gearing down is desired. In such cases the low speed and great power desired are attained by a double reduction, usually through some form of selective gearing, from the transmission shaft to the rear axle, but the employment of the double reduction involves a wasteful consumption of energy in the gearing. It is therefore proposed, by the present invention, to provide a form of transmission gearing such that there shall be always, at all speeds, even at the highest speed, a reduction between the engine shaft and the transmission shaft with a single, non-selective reduction gearing between the transmission shaft and the rear axle, whereby the slow speed and conservation of power are attained without waste of energy through the multiple-reduction gearing at the rear axle. The transmission gearing to be described hereinafter has been devised with special reference to the attainment of this result but possesses desirable characteristics, particularly in the way of simplicity, compactness and ease of operation, which render it useful for other purposes than the driving of trucks. The invention will be more fully explained hereinafter with reference to the accompanying drawings in which it is illustrated and in which—

Figure 1 is a partial view in side elevation, partly broken out and partly in longitudinal section, of a truck chassis to which the invention is applied.

Fig. 2 is a detail view of the transmission gearing, partly in elevation and partly in longitudinal section.

The truck represented in Fig. 1 of the drawings has the usual longitudinal frame members $a$, at the forward end of which is mounted the usual motor $b$, indicated by dotted lines, front steering wheels $c$ and rear driving wheels $c'$. The driving shaft $d$, coupled to the motor through the usual clutch, indicated at $d'$, in dotted lines, is coupled directly to the driving shaft $d^2$ of the transmission indicated by its casing $d^3$ in Fig. 1 and shown in detail in Fig. 2. The transmission is connected through a universal joint $d^4$ with a rear transmission shaft $d^5$ which is again coupled, through a universal joint $d^6$, with a short shaft $d^7$ which carries a bevel pinion $d^8$ in mesh with a bevel gear $d^9$ on the rear axle, this latter arrangement constituting a single reduction, non-selective, bevel-gear drive for the rear axle.

The casing $d^3$ of the transmission, with its internal members, supports the driving shaft $d^2$ of the transmission, which forms, in effect, a continuation of the main driving shaft or engine shaft $d$, and the counter shaft $e$ which is in alinement with the rear transmission shaft $d^5$ and is coupled therewith through the universal joint $d^4$, which may be of any usual or suitable construction. The main or driving shaft $d^2$ of the transmission has formed therewith or secured thereon a broad-faced pinion $f$ which is in constant mesh with a gear $g'$ on a sleeve $g$ which is mounted on the counter shaft $e$, and has also secured thereon or formed therewith the third speed gears $g^2$ and $g^3$ of successively smaller diameters. The shaft $e$ has secured thereon the external gear $h$ and the internal gear $h^3$, these two gears being conveniently formed on one annulus $h'$ which is bolted to the hub $h^2$ fixed on the shaft $e$ so as to drive the same, or, it may be, formed to engage the flange hub $i$ which carries one member of the universal joint $d^4$.

The main driving shaft $d^2$ of the transmission has mounted loosely thereon a sleeve $k$ which may be shifted endwise by suitable means, not shown, and has at one end internal teeth $k'$, adapted for engagement with the pinion $f$, and at the other end is formed with or has secured thereto a gear $k^2$ in constant mesh with the gear $h$ on the counter shaft $e$. Mounted on the sleeve $k$ is a short sleeve $m$ which may be moved endwise on the sleeve $k$ by any suitable means, not necessary to be shown, and is in rotative engagement therewith, through splines $k^3$, the sleeve $m$ having formed therewith or secured thereto a gear $m^2$, adapted to mesh with the gear $g^2$ when the sleeve $m$ is moved to the left, and a gear $m^3$ adapted to mesh with the gear $g^3$, when the sleeve is moved to the right.

It will be observed that the sleeve $g$, which can be moved endwise by any suitable means, not necessary to be shown herein, is driven constantly through the engagement of the gear $g'$ with the broad-faced pinion $f$, and that the sleeve $k$ is in constant operative engagement with the hub $h^2$, and therefore with the rear transmission shaft $d^5$, through the engagement of the gear $k^2$ with the broad-faced gear $h$. It will further be observed that the sleeve $g$ is capable, through endwise movement, of being brought into direct driving engagement with the hub $h^2$ and therefore with the rear transmission shaft $d^5$, through engagement of the gear $g^3$ thereon with the internal gear or teeth $h^3$ of the annulus $h'$. It will be noted further that as the gear $f$ is small and the gear $g'$ is relatively large, there is always a reduction or gearing down from the main shaft $d^2$ to the sleeve $g$. When the sleeve $g$ is moved to the right to place the gear $g^3$ in engagement with the annulus $h'$ through the teeth $h^3$, the rear transmission shaft and, therefore, the rear axle will be driven at the third speed, there being at that time no other gears in mesh with either the gear $g^2$ or the gear $g^3$ of the sleeve $g$.

If the sleeve $k$ be moved to the left, from the position shown in Fig. 2, so as to move the teeth $k'$ into engagement with the pinion $f$, the gear $k^2$ being still in mesh with the gear $h$, the hub $h^2$ and, therefore, the transmission shaft $d^5$, will be driven at the fourth or highest speed, but nevertheless with a reduction, through the gears $k^2$ and $h$, from the main driving shaft to the rear transmission shaft. Under the conditions just referred to, the sleeve $g$ and its gears rotate idly.

The sleeve $k$, being constantly in driving engagement with the hub $h^2$ through the meshing of the gears $k^2$ and $h$, is capable, when it is in its right hand position, of being driven from the sleeve $g$, selectively, through the endwise movement of the secondary sleeve $m$. If this sleeve $m$ be shifted to the left, so as to place the gear $m^2$ in mesh with the gear $g^2$, the hub $h^2$ and the rear transmission shaft will be driven at the second speed, while if the sleeve $m$ be moved endwise to the right, so as to place the gear $m^3$ in mesh with the gear $g^3$, then the hub $h^2$ and the rear transmission shaft will be driven at the first or slow speed. In each of the positions of the sleeve $m$ just referred to, there will be two speed changes: When the sleeve $m$ is in its left hand position there will be a great reducton between the gears $f$ and $g'$ and a slight increase between the gears $g^2$ and $m^2$, yielding the second speed or next to the lowest; and when the sleeve $m$ is in its right hand position, there will be a great reduction between the gears $f$ and $g'$ and another great reduction between the gears $g^3$ and $m^3$, yielding the first or slowest speed. If the sleeve $g$ be moved to the right, so as to place the gear $g^2$ in mesh with the gear $m^2$ and at the same time the gear $g^3$ in engagement with the internal teeth $h^3$ of the annulus $h'$, the hub $h^2$, and therefore the rear transmission shaft $d^5$, will be driven at the third speed. The gears $g^2$ and $m^2$ and $k^2$ and $h$ are so related that the speed of the hub $h^2$ is the same whether produced through these gears from the sleeve $g$ or through the direct engagement of the gear $g^3$ with the teeth $h^3$ of the annulus $h'$.

The usual reverse gears are provided on a third shaft or spindle, adapted to effect a drive in reverse from the gear $g^2$ through the gear $m^3$, but as the present invention is not concerned with or in any way dependent upon the arrangement of the reverse gears it is not necessary to show or describe them.

It will be understood that the relative proportions and to some extent the arrangement of the several gears may be varied to suit different conditions of use without departing from the spirit of the invention, which is not limited to the particular construction shown and described herein except as pointed out in the accompanying claims.

I claim as my invention:

1. A selective transmission gearing for motor vehicles, comprising a main driving shaft, a counter shaft, a driving pinion on the main shaft, a hub mounted on the counter shaft and carrying teeth, and a sleeve mounted loosely on the counter shaft and adapted for endwise movement thereon, said sleeve having a gear in constant mesh with the gear on the main driving shaft and a toothed portion adapted for engagement with the teeth carried by said hub.

2. A selective transmission gearing for motor vehicles, comprising a main driving shaft, a counter shaft, a driving pinion on the main driving shaft, an endwise movable sleeve mounted loosely on the counter shaft and having a gear in constant mesh with a pinion on the main driving shaft and a second gear, a gear fixed on the counter shaft, a sleeve mounted on the main driving shaft and having a gear in mesh with the gear fixed on the counter shaft and a gear in operative relation with said last named sleeve and adapted to be meshed with the second gear on said sleeve.

3. A selective transmission gearing for motor vehicles, comprising a main driving shaft, a counter shaft, a driving pinion on the main shaft, a driven gear mounted on the counter shaft, a sleeve mounted loosely on the counter shaft and having one gear in mesh with the driving pinion and two other gears of different diameters, an endwise movable sleeve mounted loosely on the main shaft and having a gear in mesh with the driven gear, and a second endwise movable sleeve mounted on the last named sleeve and having two gears adapted to be engaged selectively with the second and third gears of the sleeve on the counter shaft.

4. A selective transmission gearing for motor vehicles, comprising a main driving shaft, a counter shaft, a driving pinion on the main shaft, a driven gear fixed on the counter shaft, an endwise movable sleeve mounted on the main shaft and having a gear in mesh with the driven gear and teeth adapted to engage the driving pinion.

This specification signed this 1st day of May, A. D. 1918.

ALFRED F. MASURY.